United States Patent
Polania Cabrera et al.

(10) Patent No.: US 10,438,258 B2
(45) Date of Patent: Oct. 8, 2019

(54) METHOD AND APPARATUS FOR GENERATING GRAPHICAL CHROMOPHORE MAPS

(71) Applicants: The Procter & Gamble Company, Cincinnati, OH (US); Xerox Corporation, Norwalk, CT (US)

(72) Inventors: Luisa Fernanda Polania Cabrera, Webster, NY (US); Raja Bala, Pittsford, NY (US); Paul Jonathan Matts, Surrey (GB); Ankur Purwar, Sunglade (SG)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/414,002

(22) Filed: Jan. 24, 2017

(65) Prior Publication Data

US 2017/0270349 A1 Sep. 21, 2017

Related U.S. Application Data (60) Provisional application No. 62/311,175, filed on Mar. 21, 2016.

(51) Int. Cl.
*G06Q 30/06* (2012.01)
*G06T 7/11* (2017.01)
(Continued)

(52) U.S. Cl.
CPC ........... *G06Q 30/0621* (2013.01); *G06K 9/00* (2013.01); *G06T 7/11* (2017.01); *G06T 7/90* (2017.01);
(Continued)

(58) Field of Classification Search
CPC .. G06K 9/00268; G06K 9/00228; G06T 7/11; G06T 7/90; G06T 2207/10024; G06T 2207/30201
See application file for complete search history.

(56) References Cited

U.S. PATENT DOCUMENTS

| 5,983,120 A | 11/1999 | Groner et al. |
| 8,077,931 B1 | 12/2011 | Chatman |

(Continued)

OTHER PUBLICATIONS

Hyvarinen et al: "A Fast Fixed-Point Algorithm for Independent Component Analysis", Neural Computation, 1997.*
(Continued)

*Primary Examiner* — Ruiping Li
(74) *Attorney, Agent, or Firm* — John G. Powell (57) ABSTRACT

A method, non-transitory computer readable medium and apparatus for generating graphical chromophore maps are disclosed. For example, the method includes receiving an image of a customer from a mobile endpoint device of the customer, wherein the image is taken via the mobile endpoint device of the customer, converting RGB values of the image into a spectral representation, performing a constrained independent component analysis (ICA) on the spectral representation to obtain three or more independent components that are ordered, generating a first graphical chromophore map of a first independent component of the three or more independent components that are ordered and a second graphical chromophore map of a second independent component of the three or more independent components that are ordered and transmitting the first graphical chromophore map and the second graphical chromophore map to the mobile endpoint device of the customer for display.

16 Claims, 5 Drawing Sheets

(51) Int. Cl.
 *G06T 7/90* (2017.01)
 *G06K 9/00* (2006.01)
 *G06T 11/00* (2006.01)
(52) U.S. Cl.
 CPC .... *G06T 11/00* (2013.01); *G06T 2207/10024* (2013.01); *G06T 2207/30201* (2013.01)

(56) References Cited

U.S. PATENT DOCUMENTS

| | | |
|---|---|---|
| 2007/0071314 A1 | 3/2007 | Bhatti |
| 2007/0104472 A1 | 5/2007 | Quan |
| 2008/0080746 A1 | 4/2008 | Payonk |
| 2008/0194928 A1 | 8/2008 | Bandic |
| 2009/0245603 A1 | 10/2009 | Koruga |
| 2010/0172567 A1 | 7/2010 | Prokoski |
| 2011/0016001 A1 | 1/2011 | Schieffelin |
| 2011/0196616 A1 | 8/2011 | Gunn |
| 2012/0223131 A1 | 9/2012 | Lim, Jr. |
| 2013/0041733 A1 | 2/2013 | Officer |
| 2013/0079620 A1 | 3/2013 | Kuth et al. |
| 2013/0094780 A1 | 4/2013 | Tang et al. |
| 2013/0158968 A1 | 6/2013 | Ash et al. |
| 2014/0089017 A1 | 3/2014 | Klappert et al. |
| 2014/0201126 A1 | 7/2014 | Zadeh |
| 2014/0209682 A1 | 7/2014 | Gottwals et al. |
| 2014/0211022 A1 | 7/2014 | Koh et al. |
| 2014/0219526 A1 | 8/2014 | Linguraru et al. |
| 2014/0270490 A1 | 9/2014 | Wus et al. |
| 2014/0334723 A1 | 11/2014 | Chatow |
| 2015/0045631 A1 | 2/2015 | Pederson |
| 2016/0162728 A1 | 6/2016 | Arai et al. |
| 2017/0246473 A1 | 8/2017 | Marinkovich |
| 2017/0270348 A1 | 9/2017 | Morgana et al. |
| 2017/0270350 A1 | 9/2017 | Maltz et al. |
| 2017/0270691 A1 | 9/2017 | Maltz et al. |
| 2017/0272741 A1 | 9/2017 | Maltz et al. |

OTHER PUBLICATIONS

Gong et al: "Quantification of Pigmentation in Human Skin Images", IEEE, 2012.*
Tsumura et al: "Image-based skin color and texture analysis/synthesis by extracting hemoglobin and melanin information in the skin", ACM, 2003.*
All Office Actions, U.S. Appl. No. 15/414,095.
All Office Actions, U.S. Appl. No. 15/414,147.
All Office Actions, U.S. Appl. No. 15/414,189.
All Office Actions, U.S. Appl. No. 15/414,305.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Gong et al., Quantification of Pigmentation in Human Skin Images, IEEE, 2012, pp. 2853-2856.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.

* cited by examiner

METHOD AND APPARATUS FOR GENERATING GRAPHICAL CHROMOPHORE MAPS

CROSS REFERENCE TO RELATED APPLICATIONS

This application claims priority under 35 U.S.C. § 119(e) to U.S. provisional patent application Ser. No. 62/311,175, filed on Mar. 21, 2016, which is hereby incorporated by reference in its entirety.

The present disclosure relates generally to facial image analysis and, more particularly, to a method and apparatus for generating graphical chromophore maps based on a separation of chromophores of facial regions in a mobile selfie image.

BACKGROUND

Some companies are beginning to develop products or applications to improve a consumer's skincare experience. The applications look to provide product recommendations and navigation solutions. The applications can also provide personalized skincare for the customer by providing continuous support, educating the user about skin biology, tracking the customer's skin performance over time, and customizing product and regiment solutions to the customer's individual needs.

One challenge to providing such applications is an ability to receive an accurate image of the customer's face and providing an accurate analysis of the customer's face based on the image. Some solutions may require the customer to come to a lab or a studio of the company to take images with high quality cameras in a controlled light setting. However, requiring the customer to travel to another lab or studio is time consuming and inconvenient to the customer.

Another option may be to analyze images provided by the customer. However, images provided by the customer can have a large amount of variation in image quality and lighting.

SUMMARY

According to aspects illustrated herein, there are provided a method, non-transitory computer readable medium and apparatus for generating graphical chromophore maps. One disclosed feature of the embodiments is a method that receives an image of a customer from a mobile endpoint device of the customer, wherein the image is taken via the mobile endpoint device of the customer, converts RGB values of the image into a spectral representation, performs a constrained independent component analysis (ICA) on the spectral representation to obtain three independent components that are ordered, generates a first graphical chromophore map of a first independent component of the three independent components that are ordered and a second graphical chromophore map of a second independent component of the three independent components that are ordered and transmits the first graphical chromophore map and the second graphical chromophore map to the mobile endpoint device of the customer for display.

Another disclosed feature of the embodiments is a non-transitory computer-readable medium having stored thereon a plurality of instructions, the plurality of instructions including instructions which, when executed by a processor, cause the processor to perform operations that receive an image of a customer from a mobile endpoint device of the customer, wherein the image is taken via the mobile endpoint device of the customer, convert RGB values of the image into a spectral representation, performs a constrained independent component analysis (ICA) on the spectral representation to obtain three independent components that are ordered, generate a first graphical chromophore map of a first independent component of the three independent components that are ordered and a second graphical chromophore map of a second independent component of the three independent components that are ordered and transmit the first graphical chromophore map and the second graphical chromophore map to the mobile endpoint device of the customer for display.

Another disclosed feature of the embodiments is an apparatus comprising a processor and a computer-readable medium storing a plurality of instructions which, when executed by the processor, cause the processor to perform operations that receive an image of a customer from a mobile endpoint device of the customer, wherein the image is taken via the mobile endpoint device of the customer, convert RGB values of the image into a spectral representation, performs a constrained independent component analysis (ICA) on the spectral representation to obtain three independent components that are ordered, generate a first graphical chromophore map of a first independent component of the three independent components that are ordered and a second graphical chromophore map of a second independent component of the three independent components that are ordered and transmit the first graphical chromophore map and the second graphical chromophore map to the mobile endpoint device of the customer for display.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating graphical chromophore maps. As discussed above, some companies are beginning to develop products or applications to improve a consumer's skincare experience. In doing so, an image of the customer can be used to analyze the health of the customer's skin. One way of analyzing the health of a customer's skin is to calculate chromophore concentrations in the skin as chromophore concentrations may be markers for various skin diseases and factors that may affect overall skin tone.

Embodiments of the present disclosure provide a novel method and apparatus to accurately separate different components of the chromophore concentrations from a self-taken image of the customer (e.g., a selfie image of the customer's face). The different components may include melanin, hemoglobin and shading. The embodiments of the present disclosure allow shading to be removed from the graphical chromophore maps that are generated to provide a more accurate representation of the melanin and hemoglobin components of a customer's skin.

In addition, the present disclosure uses a modified constrained independent component analysis (ICA) on a spectral representation of the image, rather than the RGB values of the image. The modified constrained ICA provides an additional term that exploits knowledge of the melanin and hemoglobin absorption curves.

The additional term also allows the components to be ordered. In other words, by comparing the spectral curves of a particular component, a column of values is known to be associated with that particular component. Said another way, the columns in a matrix of weighted values obtained by the modified constrained ICA analysis are known to be the melanin component, the hemoglobin component or the shading component. Graphical chromophore maps may then be generated based on only one of the components (e.g., a melanin graphical chromophore map or a hemoglobin graphical chromophore map).

Figure 1:
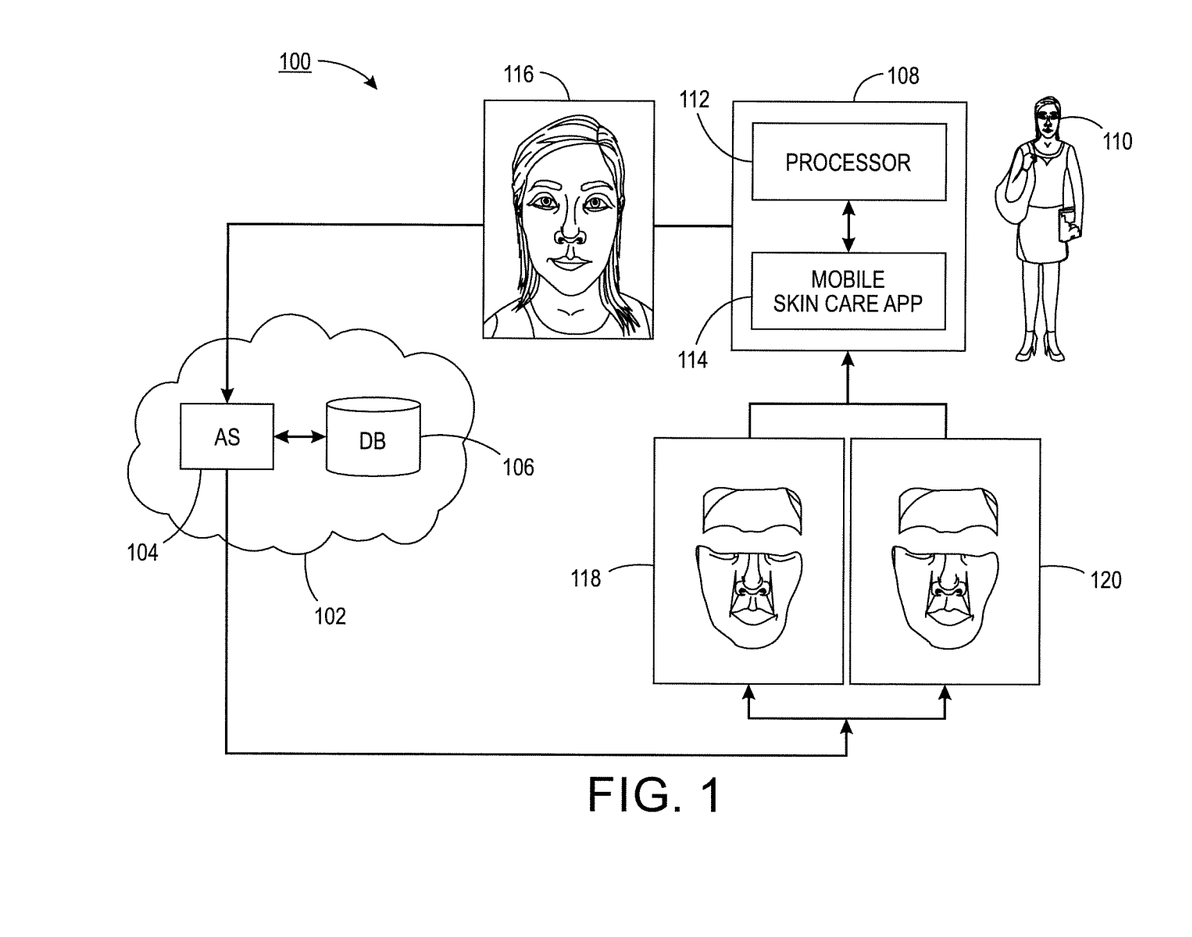
FIG. 1 illustrates an example block diagram of a communication network of the present disclosure.

FIG. 1 illustrates an example system 100 of the present disclosure. In one embodiment, the system 100 may include a communication network 102. The communication network 102 may be any type of wired or wireless communication network. In one embodiment, the communication network 102 may be an Internet Protocol (IP) network.

It should be noted that the communication network 102 has been simplified for ease of explanation. For example, the communication network 102 may include one or more additional network elements (e.g., a router, a gateway, a border element, switches, and the like) or access networks (e.g., a cellular access network, a broadband access network, and the like) that are not shown.

In one embodiment, the communication network 102 may include an application server (AS) 104 and a database (DB) 106. In one embodiment, the AS 104 may establish a wired or wireless connection with one or more mobile endpoint devices 108 to receive and transmit images to the one or more mobile endpoint devices 108 and perform the functions described herein.

In one embodiment, the DB 106 may store various information associated with the functions described herein. For example, the DB 106 may store graphs generated based on training images, one or more images 116 received from the one or more endpoint devices 108 of one or more customers 110, generated graphical chromophore maps 118 and 120, and the like.

It should be noted that although FIG. 1 illustrates a single mobile endpoint device 108, a single customer 110, a single AS 104, and a single DB 106, that any number of mobile endpoint devices, customers, application servers and databases may be deployed. For example, multiple application servers 104 may be deployed to perform a distributed processing of the images 116. In another example, a plurality of mobile endpoint devices 108 may be sending images of different customers 110 to be analyzed and processed to generate respective graphical chromophore maps for each customer 110.

In one embodiment, the mobile endpoint device 108 may include a processor 112 and a mobile skin care application 114. The mobile skin care application 114 may be used to help provide a customized skincare experience for the customer 110. The mobile skin care application 114 may leverage the camera and/or flash (not shown) of the mobile endpoint device 108 to capture the image 116 of the customer 110. The image 116 may also be referred to as a mobile selfie image. In other words, the image 116 captures a face or headshot of the customer 110.

In one embodiment, the mobile skin care application 114 may send the image 116 to the AS 104 for processing to generate one or more graphical chromophore maps 118 and 120. It should be noted that as the processing power of the mobile endpoint device 108 increases, the functions performed by the AS 104 may be performed by the mobile endpoint device 108. In other words, in one embodiment, image 116 may be analyzed and processed by the mobile endpoint device 108 and the graphical chromophore maps 118 and 120 may be generated and displayed by the mobile endpoint device 108.

In one embodiment, the graphical chromophore map 118 may be a melanin graphical chromophore map and the graphical chromophore map 120 may be a hemoglobin graphical chromophore map. Generating accurate melanin and hemoglobin graphical chromophore maps may help to provide accurate health assessments of the skin of the customer 110. In one embodiment, the graphical chromophore maps may be generated more accurately by eliminating a shading component.

For example, melanin occurs at varying depths within the epidermis and is responsible for solar radiation protection and for determining skin color. Melanin is also involved in several human skin pathologies, such as malignant melanoma, albinism, vitiligo and miasma.

Hemoglobin is the pigment related to red blood cells, which are mostly present in vascular densities at the papillary dermis. Some skin conditions, such as acne, rosacea, and telangiectasia may cause organic changes in the vascular structure and elevate the hemoglobin levels. An increased amount of hemoglobin causes a red coloration, and therefore, has a negative impact on skin appearance.

Figure 2:
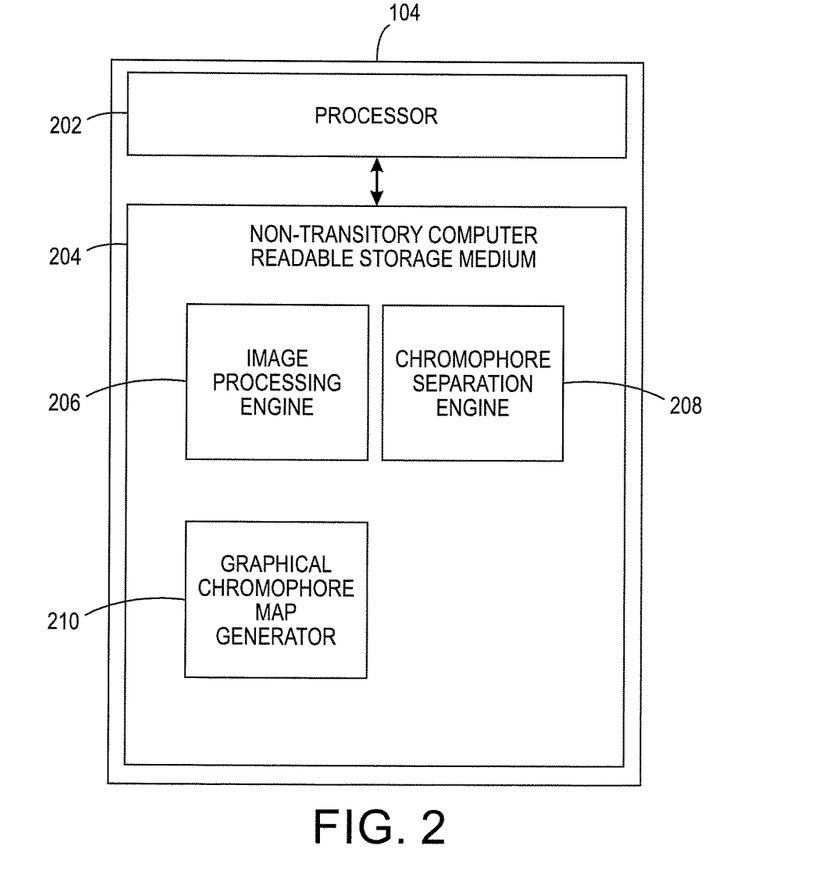
FIG. 2 illustrates an example apparatus of the present disclosure.

FIG. 2 illustrates an example apparatus of the present disclosure. In one embodiment, the apparatus may be the AS 104. In other words, the AS 104 may be a dedicated machine to perform the functions described herein.

In one embodiment, the AS 104 may include a processor 202 and a non-transitory computer readable storage medium 204. In one embodiment, the non-transitory computer readable storage medium 204 may store instructions, or engines, that are executed by the processor 202 to perform the functions described herein.

In one embodiment, the non-transitory computer readable storage medium 204 may include an image processing engine 206, a chromophore separation engine 208, and a graphical chromophore map generator 210. In one embodiment, the image processing engine 206 may be used to receive the image 116 that is taken in the red, green, blue (RGB) color space and convert the image 116 into a spectral representation. The spectral representations may comprise conversion of the RGB values of each pixel into corresponding wavelengths of the RGB values.

In one embodiment, any type of RGB to spectral representation conversion function may be applied. In one embodiment, assuming that the modified Lambert-Beer law is applicable to skin layers, the reflected radiant flux of the skin L(x, y, λ) can be expressed as shown in Equation (1) below:

$$L(x,y,\lambda) = \exp\{-\sigma_m(\lambda) l_m(\lambda) \rho_m(x,y) - \sigma_h(\lambda) l_h(\lambda) \rho_h(x,y)\} E(x,y,\lambda),$$  Equation 1 where λ denotes the wavelength, E(x, y, λ) is the incident radiant flux, (x, y) are the position coordinates on the skin surface, $\rho_m$, $\rho_h$, $\sigma_m$, $\sigma_h$, are the pigment densities and spectral cross-sections of melanin and hemoglobin, respectively, and $l_m$ and $l_h$ are the mean path lengths of photons in the epidermis (e.g., melanin) and dermis layers (e.g., hemoglobin), respectively. It may be assumed that the lighting environment is distant and that the spectrum of the lighting environment does not vary with direction, so that the incident radiant flux can be written as E(x, y, λ)=p(x, y)Ē(λ), where p(x, y) represents shading strength and Ē(λ) denotes the illuminant. The wavelength range of interest, corresponding to the visible spectrum, may be set to 400 nanometers (nm)≤λ≤700 nm.

The logarithm of the incident radiant flux for different values of λ, λ=$\lambda_1$, ..., $\lambda_N$, can be expressed in vector form as shown in Equation (2) below:

$$[\log(L(x,y,\lambda_1)), \ldots, \log(L(x,y,\lambda_N))]^T = -[\sigma_m(\lambda_1) l_m(\lambda_1), \ldots, \sigma_m(\lambda_N) l_m(\lambda_N)]^T \rho_m(x,y) - [\sigma_h(\lambda_1) l_h(\lambda_1), \ldots, \sigma_h(\lambda_N) l_h(\lambda_N)]^T \rho_h(x,y) + \log(p(x,y)) 1 + [\log(E(\lambda_1)), \ldots, \log(E(\lambda_N))]^T,$$  Equation 2 where 1 denotes the vector of ones of length N.

Based upon the above spectral representations of the skin, one example of a function for conversion from the RGB to spectral representation may be from Fairchild and Sun, entitled "Statistical Characterization of Face Spectral Reflectances and Its Application to Human Portraiture Spectral Estimation," which is incorporated by reference in its entirety. Fairchild and Sun states that skin colors lie in a low dimensional space that the skin spectral reflectance can be efficiently represented as a linear combination of three basis vectors. Prior to the conversion, the image 116 may be preprocessed to remove areas affected by specularity reflectance.

The conversion may consider additional parameters such as the illuminance of the scene of the image 116 and camera sensitivities. In one embodiment, an inversion may rely on published work (e.g., Sun, Qun, and Mark D. Fairchild, "Statistical Characterization of Spectral Reflectances in Spectral Imaging of Human Portraiture," Color and Imaging Conference, Vol. 2001, No. 1, Society for Imaging Science and Technology, 2001, which is hereby incorporated by reference in its entirety), which states that the skin spectral reflectance can be accurately represented as a linear combination of three basis vectors.

In one embodiment, the image processing engine 206 may also identify one or more facial regions from the image 116. For example, the facial regions may include a mouth, cheeks, a nose, a forehead, and the like. Known face parsing algorithms may be applied to identify and segment the desired facial regions. Most existing face parsing methods start with landmark localization followed by landmark refinement using classification or regression approaches, such as the cascaded regression technique.

In one embodiment, the chromophore separation engine 208 may perform component analysis on the spectral representation of the image 116 to obtain three independent components. In one embodiment, the three independent components may be a melanin component, a hemoglobin component, and a shading component. In one embodiment, obtaining a separate shading component allows the shading component to be removed from the graphical chromophore maps of the melanin and hemoglobin, thereby providing more accurate graphical chromophore maps.

In one embodiment, the independent components may be obtained from the spectral representation of the image 116 using a constrained independent component analysis (ICA). In contrast, previous methods applied ICA in the RGB space. However, one drawback of such approach is that it requires extreme simplifications, such as treating the camera sensitivities as delta functions.

In one embodiment, the constrained ICA of the present disclosure may be modified to use an additional distance term to the constrained ICA. The distance term helps disambiguate the order of the independent components such that which independent component is represented by which column of a mixing matrix W is known. In one embodiment, the modified constrained ICA of the present disclosure may be represented by Equation (3) below:

$$\hat{y}_i = \arg\min_{y_i} -|kurt(y_i^T z)| + \lambda \|y_i - w_i\|_2^2$$  Equation (3)

$$i = 1, 2$$

where i denotes the chromophore index (e.g., melanin or hemoglobin), λ is the regularization parameter, kurt(•) denotes the kurtosis, $w_i$, i=1,2, denote the column vectors of W assigned to the chromophores, z denotes the vector of mixtures, and $y_i$, i=1,2 denote the vectors of the optimal mixing matrix.

In one embodiment, the term $-|kurt(y_i^T z)|$ may account for the independence of the source signals, while the term $\lambda \|y_i - w_i\|_2^2$ enforces similarity with the vectors that are expected to lead to good chromophore separation. In other words, the term $\lambda \|y_i - w_i\|_2^2$ may be a distance component that is added to a traditional constrained ICA that usually only consist of the term $-|kurt(y_i^T z)|$. The term $\lambda \|y_i - w_i\|_2^2$ may also help order the independent components that are obtained from the constrained ICA that is applied.

For example, the constrained ICA may be applied to training images to generate vectors of the mixing matrix W that lead to good chromophore separation. The vectors of the mixing matrices that lead to good chromophore separation can be seen to have some similar features related to the absorption curves of the melanin component and the hemoglobin component.

Figure 3:
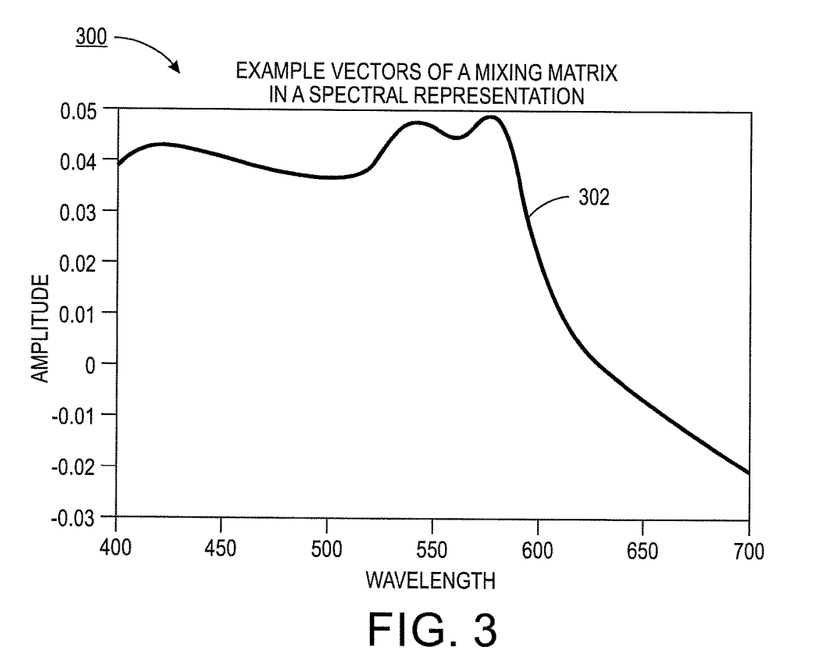
FIG. 3 illustrates an example of a graph of vectors of a mixing matrix for an independent component in a spectral representation.

FIG. 3 illustrates an example of a graph 300 that includes an expected spectral curve 302 of the vector associated with the hemoglobin component, that is obtained as a result of the application of the traditional ICA algorithm on training facial images. The graph illustrates a plot of wavelength versus amplitude of the vector. In one embodiment, the plot of the vector in the graph 300 can be used to force the vectors of $y_i$ in the term $\lambda \|y_i - w_i\|_2^2$ to be as close to the spectral curve 302 as possible. In other words, the second term $\lambda \|y_i - w_i\|_2^2$ can be minimized. Also, as noted above, by forcing the vectors of $y_i$ in the term $\lambda \|y_i - w_i\|_2^2$ to be as close to the spectral curve 302 as possible, it may be known that the first column of the mixing matrix W may represent the hemoglobin component. Subsequently, the process may be repeated with forcing the vectors of $y_i$ in the term $\lambda \|y_i - w_i\|_2^2$ to be as close to a spectral curve for the melanin component and it may be known that the second column of the mixing matrix W may represent the melanin component, and so forth.

Referring back to the Equation (3), Equation (3) may be solved by using a steepest gradient descent algorithm. The optimal step size may be selected at each iteration using backtracking line search. The vector $\hat{y}_3$ is set to the vector of ones to model the shading component.

Compared to the traditional ICA algorithm, the modified constrained ICA in Equation (3) significantly reduces the number of failures in the chromophore separation and successfully disambiguates the order of the independent components. In one embodiment, to ensure a good separation of the independent components an additional step may be added to the modified constrained ICA of Equation (3). After solving Equation (3), a correlation between $\hat{y}_i$ and $w_i$, i=1,2, using the Pearson correlation coefficient (PCC) may be evaluated. If PCC is above 0.6, it may be assumed that the separation was successful. Otherwise, the term $\hat{y}_i$ can be set as $\hat{y}_i = w_i$, to ensure a good separation and knowledge of the order.

In one embodiment, the regularization parameter $\lambda$ controls the trade-off between the independence of the source signals and the similarity with the column vectors of W. A plot may be created that corresponds to $|\text{kurt}(\hat{y}_1^T z)|$ versus $\lambda \|\hat{y}_1 - w_1\|_2^2$, parametrized by $\lambda$ for one or more of the training images. The value of $\lambda$ may be set to a value that balances the two terms $|\text{kurt}(\hat{y}_1^T z)|$ and $\lambda \|\hat{y}_1 - w_1\|_2^2$, which may correspond to a point of maximum curvature in the plot.

In one embodiment, the graphical chromophore map generator 210 may then generate a graphical chromophore map for one or more of the independent components that are separated. In one embodiment, the graphical chromophore map generator 210 may generate a hemoglobin graphical chromophore map and a melanin graphical chromophore map.

Figure 4:
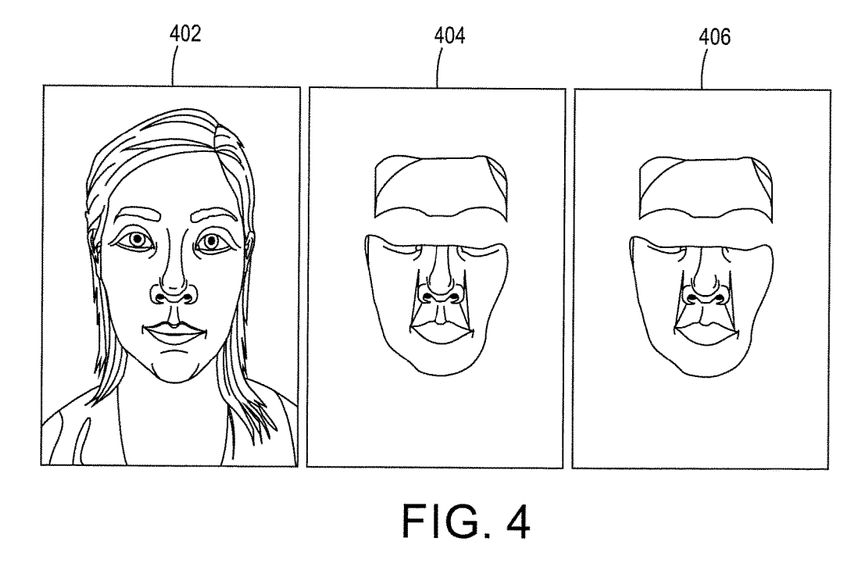
FIG. 4 illustrates an example of an image of a customer, a hemoglobin graphical chromophore map, and a melanin graphical chromophore map.

FIG. 4 illustrates one example of an image 402 of a customer (e.g., a mobile selfie image), a hemoglobin graphical chromophore map 404 and a melanin graphical chromophore map 406. In one embodiment, the hemoglobin graphical chromophore map 404 and the melanin graphical chromophore map 406 may map only the facial regions that were segmented out by the image processing engine 206. For example, certain regions of the face may be excluded from the graphical chromophore maps 404 and 406, such as the lips, the eyes, the eyebrows, the hair, the neck, and the like. In addition, the graphical chromophore maps 404 and 406 do not display the background of the image 402.

In one embodiment, the graphical chromophore map generator 210 may generate hemoglobin graphical chromophore map 404 and the melanin graphical chromophore map 406 using the mixing matrix of weighted values for the three independent components obtained by the chromophore separation engine 208. In one embodiment, to generate the hemoglobin graphical chromophore map 404, the weight values of the column that represent shading and the column that represents melanin may be set to zero.

Then for each pixel in the facial regions that are visualized in the hemoglobin graphical chromophore map 404, the weighted spectral representation at the pixel location may be inverted back to a corresponding RGB value for that pixel location. The inversion uses an unmixing matrix, which is the transpose of the mixing matrix assuming that whitening was applied to the input data as part of the preprocessing. This may be repeated for each pixel of each facial region that is visualized in the hemoglobin graphical chromophore map 404.

Similarly, to generate the melanin graphical chromophore map 406, the values of the column that represent shading and the column that represents hemoglobin may be set to zero. Then for each pixel in the facial regions that are visualized in the melanin graphical chromophore map 406, the weighted spectral representation at the pixel location may be inverted back to a corresponding RGB value for that pixel location using an unmixing matrix, which is the transpose of the mixing matrix assuming that whitening was applied to the input data as part of the preprocessing. This may be repeated for each pixel of each facial region that is visualized in the melanin graphical chromophore map 406.

After the hemoglobin graphical chromophore map 404 and melanin graphical chromophore map 406 are generated, the maps 404 and 406 (also shown as maps 118 and 120 in FIG. 1) may be transmitted back to the mobile endpoint device 108. The mobile skincare app 114 may then format the maps 404 and 406 (e.g., resolution, size, orientation, and the like) to be properly displayed on a display of the mobile endpoint device.

Thus, using the modified constrained ICA of the present disclosure, more accurate graphical chromophore maps may be generated. For example, moles can be properly captured in the melanin graphical chromophore map 406. In addition, redness in cheek regions and coloration around the periphery of a lip region may be captured by the hemoglobin graphical chromophore map 404.

Figure 5:
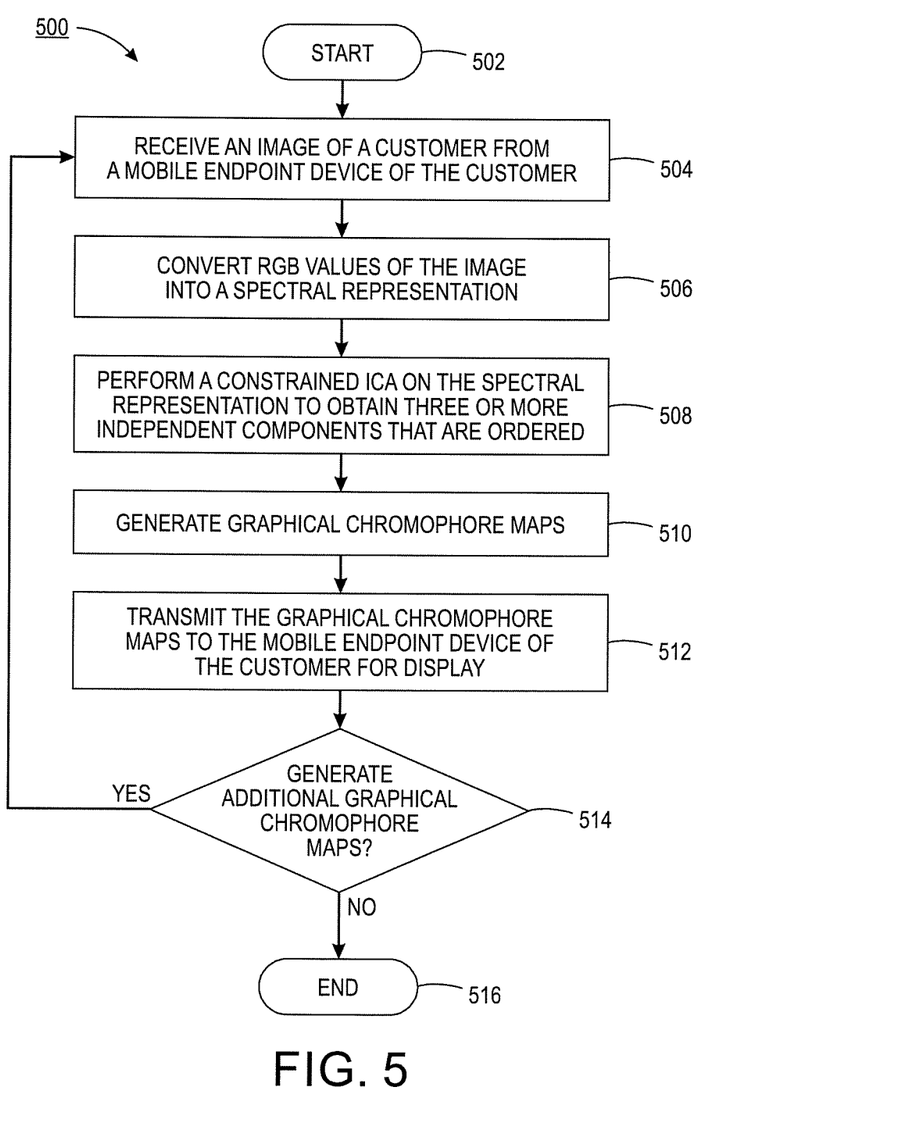
FIG. 5 illustrates a flowchart of an example method for generating graphical chromophore maps.
Figure 6:
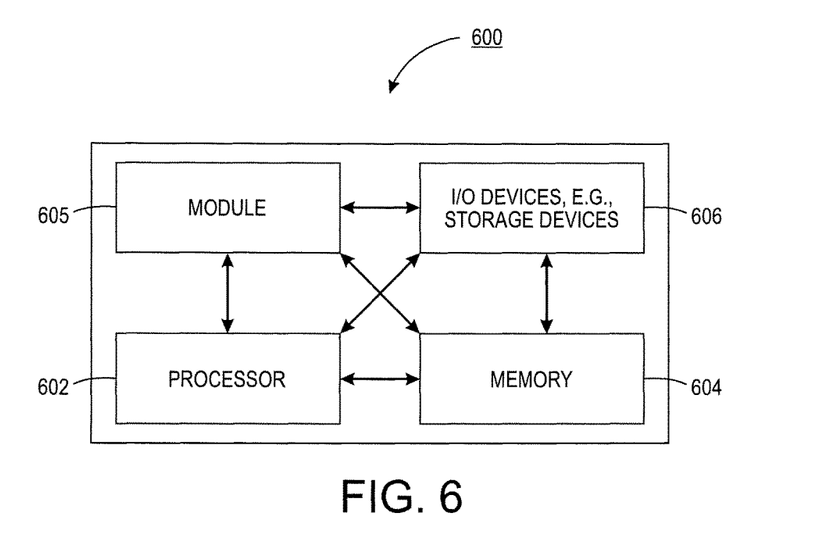
FIG. 6 illustrates a high-level block diagram of a computer suitable for use in performing the functions described herein.

FIG. 5 illustrates a flowchart of an example method 500 for generating graphical chromophore maps. In one embodiment, one or more steps or operations of the method 500 may be performed by the AS 104 or a computer as illustrated in FIG. 6 and discussed below.

At block 502, the method 500 begins. At block 504, the method 500 receives an image of a customer from a mobile endpoint device of the customer. In one embodiment, the image may be a mobile selfie image that is taken via the mobile endpoint device of the customer. The image may contain a face or a head of the customer that shows all of the desired facial regions that will be analyzed to generate the graphical chromophore maps.

In one embodiment, a segmentation algorithm may be applied to the image to extract one or more facial regions of the face of the customer. For example, the facial regions may include a mouth, cheeks, a nose, a forehead, and the like, of the customer.

At block 506, the method 500 converts RGB values of the image into a spectral representation. Any type of RGB to spectral representation conversion function may be applied, as described above.

At block 508, the method 500 performs a constrained ICA on the spectral representation to obtain three independent components that are ordered. In one embodiment, the constrained ICA may be modified to include a distance component that may help to order the independent three independent components. For example, the modified constrained ICA may attempt to minimize a distance between a spectral curve (e.g., the curve of vectors for a particular independent component obtained from training images as illustrated by example in graph 300 of FIG. 3) associated to a certain chromophore and the vector of the mixing matrix associated to such chromophore. One example of the modified constrained ICA is described above with reference to Equation (3).

In one embodiment, the three independent components may include a melanin component, a hemoglobin component and a shading component. The modified constrained ICA analysis may generate a matrix of weight values. In one embodiment, each row of the matrix comprises a plurality of wavelengths (e.g., the limited wavelengths that represent various skin tone colors or pigments). In one embodiment, each column of the matrix may represent one of the three independent components. For example, one column may represent the hemoglobin component, one column may represent the melanin component and one column may represent the shading component. By separating out the shading component, the shading component may be removed from the graphical chromophore maps of the melanin component and the hemoglobin component to provide more accurate graphical chromophore maps.

At block 510, the method 500 generates graphical chromophore maps. In one embodiment, the method 500 may generate a first graphical chromophore map that displays a first independent component in the one or more facial regions and a second graphical chromophore map that displays the second independent component in the one or more facial regions. For example, the first graphical chromophore map may be a melanin graphical chromophore map and the second graphical chromophore map may be a hemoglobin chromophore map.

In one embodiment, the graphical chromophore maps may be generated using only the weight values in a matrix of weight values generated by the constrained ICA analysis of the independent component associated with the graphical chromophore map that is being generated. For example, if the first graphical chromophore map of the first independent component is being generated, the weight values for all independent components except the first independent component may be set to zero. Then the weight values of the first independent component for the plurality of wavelengths may be inverted into a corresponding RGB value. This may be performed for each pixel in each facial region that will be displayed in the first graphical chromophore map.

This process may be repeated for the second graphical chromophore map. For example, the weight values for all independent components except the second independent component may be set to zero. Then the weight values of the second independent component for the plurality of wavelengths may be inverted into a corresponding RGB value. This may be performed for each pixel in each facial region that will be displayed in the second graphical chromophore map.

At block 512, the method 500 transmits the graphical chromophore maps to the mobile endpoint device of the customer for display. For example, the mobile endpoint device of the customer may display the first graphical chromophore map and the second graphical chromophore map to the customer via a display on the mobile endpoint device.

At block 514, the method 500 determines if additional graphical chromophore maps are to be generated. For example, the customer may not like the first image he or she captured and want to use a different image to generate the graphical chromophore maps. Alternatively, multiple customers (e.g., different family members) may use the same mobile endpoint device to receive the graphical chromophore maps and may send images of the multiple customers.

If the answer is yes at block 514, the method 500 may return to block 504 and the blocks 504-514 may be repeated. If the answer is no at block 514, the method 500 may proceed to block 516. At block 516, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

FIG. 6 depicts a high-level block diagram of a computer that can be transformed into a machine that is dedicated to perform the functions described herein. As a result, the embodiments of the present disclosure improve the operation and functioning of the computer to improve methods for generating graphical chromophore maps, as disclosed herein.

As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for generating graphical chromophore maps, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for generating graphical chromophore maps (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating graphical chromophore maps (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving, by a processor, an image of a customer from a mobile endpoint device of the customer, wherein the image is taken via the mobile endpoint device of the customer;
   converting, by the processor, red, green and blue (RGB) values of the image into a spectral representation;
   performing, by the processor, a constrained independent component analysis (ICA) on the spectral representation to obtain three independent components that are ordered, wherein the three independent components are ordered by the constrained ICA by adding a distance component to the constrained ICA, wherein the distance component minimizes a distance between a spectral vector associated with one of the three independent components and a vector of a mixing matrix associated with the one of the three independent components, wherein the spectral vector is calculated during a training phase;
   generating, by the processor, a first graphical chromophore map of a first independent component of the three independent components that are ordered and a second graphical chromophore map of a second independent component of the three independent components that are ordered; and
   transmitting, by the processor, the first graphical chromophore map and the second graphical chromophore map to the mobile endpoint device of the customer for display.

2. The method of claim 1, wherein the image is of a face of the customer.

3. The method of claim 2, further comprising:
   extracting, by the processor, one or more facial regions of the face.

4. The method of claim 3, wherein the first graphical chromophore map displays the first independent component in the one or more facial regions and the second graphical chromophore map displays the second independent component in the one or more facial regions.

5. The method of claim 1, wherein the three independent components that are ordered comprise a melanin component, a hemoglobin component and a shading component.

6. The method of claim 1, wherein the constrained ICA analysis provides a mixing matrix, wherein each row of the mixing matrix comprises a plurality of wavelengths and each column of the mixing matrix comprises one of the three independent components and a weight vector of the three independent components.

7. The method of claim 6, wherein the generating the first graphical chromophore map, comprises:
   setting, by the processor, weight values for all independent components except the first independent component to zero; and
   inverting, by the processor, the weight values of the first independent component for the plurality of wavelengths into corresponding RGB values.

8. The method of claim 6, wherein the generating the second graphical chromophore map, comprises:
   setting, by the processor, weight values for all independent components except the second independent component to zero; and
   inverting, by the processor, the weight values of the second independent component for the plurality of wavelengths into corresponding RGB values.

9. A non-transitory computer-readable medium storing a plurality of instructions, which when executed by a processor, cause the processor to perform operations, the operations comprising:
   receiving an image of a customer from a mobile endpoint device of the customer, wherein the image is taken via the mobile endpoint device of the customer;
   converting red, green and blue (RGB) values of the image into a spectral representation;
   performing a constrained independent component analysis (ICA) on the spectral representation to obtain three independent components that are ordered, wherein the three independent components are ordered by the constrained ICA by adding a distance component to the constrained ICA, wherein the distance component minimizes a distance between a spectral vector associated with one of the three independent components and a vector of a mixing matrix associated with the one of the three independent components, wherein the spectral vector is calculated during a training phase;
   generating a first graphical chromophore map of a first independent component of the three independent components that are ordered and a second graphical chromophore map of a second independent component of the three independent components that are ordered; and
   transmitting the first graphical chromophore map and the second graphical chromophore map to the mobile endpoint device of the customer for display.

10. The non-transitory computer-readable medium of claim 9, wherein the image is of a face of the customer.

11. The non-transitory computer-readable medium of claim 10, further comprising:
    extracting one or more facial regions of the face.

12. The non-transitory computer-readable medium of claim 11, wherein the first graphical chromophore map displays the first independent component in the one or more facial regions and the second graphical chromophore map displays the second independent component in the one or more facial regions.

13. The non-transitory computer-readable medium of claim 9, wherein the three independent components that are ordered comprise a melanin component, a hemoglobin component and a shading component.

14. The non-transitory computer-readable medium of claim 9, wherein the constrained ICA analysis provides a mixing matrix, wherein each row of the mixing matrix comprises a plurality of wavelengths and each column of the mixing matrix comprises one of the three independent components and a weight vector of the three independent components.

15. The non-transitory computer-readable medium of claim 14, wherein the generating the first graphical chromophore map, comprises:
    setting weight values for all independent components except the first independent component to zero; and
    inverting the weight values of the first independent component for the plurality of wavelengths into corresponding RGB values; and
    wherein generating the second graphical chromophore map, comprises:
    setting weight values for all independent components except the second independent component to zero; and
    inverting the weight values of the second independent component for the plurality of wavelengths into corresponding RGB values.

16. A method, comprising:
    receiving, by a processor, a mobile selfie image of a face of a customer from a mobile endpoint device of the customer, wherein the mobile selfie image is taken via the mobile endpoint device of the customer;
    extracting, by the processor, facial features from the mobile selfie image, the facial features comprising a mouth, cheeks, a nose and a forehead of the customer;
    converting, by the processor, red, green and blue (RGB) values of the facial features into a spectral representation;
    performing, by the processor, a constrained independent component analysis (ICA) on the spectral representation to obtain a shading component, a melanin component, and a hemoglobin component, wherein the constrained ICA is performed using an additional distance component that orders the shading component, the melanin component and the hemoglobin component, wherein the additional distance component minimizes a distance between a spectral vector associated with one of the shading component, the melanin component and the hemoglobin component and a vector of a mixing matrix associated with the one of the shading component, the melanin component and the hemoglobin component, wherein the spectral vector is calculated during a training phase;
    generating, by the processor, a melanin graphical chromophore map based on a first inversion of only the melanin component into corresponding RGB values for each pixel that comprise the facial features from the mobile selfie image;
    generating, by the processor, a hemoglobin graphical chromophore map based on a second inversion of only the hemoglobin component into corresponding RGB values for the each pixel that comprise the facial features from the mobile selfie image; and
    transmitting, by the processor, the melanin graphical chromophore map and the hemoglobin graphical chromophore map to the mobile endpoint device of the customer for display.

* * * * *